United States Patent [19]
Pichard

[11] 4,232,637
[45] Nov. 11, 1980

[54] SURFACES FOR COMBUSTION CHAMBER OF INTERNAL COMBUSTION ENGINE HAVING CONTROLLED FUEL INJECTION

[75] Inventor: Jacques Pichard, Meudon, France

[73] Assignee: Le Moteur Moderne, Boulogne Billancourt, France

[21] Appl. No.: 33,494

[22] Filed: Apr. 26, 1979

Related U.S. Application Data

[63] Continuation of Ser. No. 815,023, Jul. 12, 1977, abandoned.

[30] Foreign Application Priority Data

Jul. 20, 1976 [FR] France ............................... 76 22142
May 3, 1977 [FR] France ............................... 77 13313

[51] Int. Cl.³ .......................... F02B 3/00; F02B 23/00
[52] U.S. Cl. ................................... 123/263; 123/290; 123/295
[58] Field of Search .............. 123/32 B, 32 C, 32 R, 123/30 C, 32 K, 32 SP, 32 ST, 191 S, 191 SP, 193 H, 193 P, 193 CH, 193 CP, 191 R

[56] References Cited

U.S. PATENT DOCUMENTS

| | | | |
|---|---|---|---|
| 2,231,392 | 2/1941 | McCarthy | 123/30 C |
| 2,766,738 | 10/1956 | Hoffmann | 123/32 C |
| 2,815,014 | 12/1957 | Adams | 123/193 P |
| 3,207,141 | 9/1965 | Freeman, Jr. et al. | 123/32 ST |
| 3,892,208 | 7/1975 | Anderson et al. | 123/32 R |
| 3,963,001 | 6/1976 | Kruckenberg et al. | 123/32 B |
| 4,067,301 | 1/1978 | Jarry | 123/191 S |

Primary Examiner—P. S. Lall
Attorney, Agent, or Firm—Finnegan, Henderson, Farabow, Garrett & Dunner

[57] ABSTRACT

In an internal combustion engine having controlled ignition, apparatus for controlling injection of the fuel so as to greatly increase the advance with the load on the engine, and a precombustion chamber into which emerge both the fuel injector and the controlled ignition device, adjacent elementary chambers formed at least in the cylinder head, the lower face of the cylinder head extending between the elementary chambers and the upper face of the piston forming an impelling surface surrounding the prechamber, the inlets into the main combustion chamber and prechamber opening into the impelling surface without throttle between the prechamber and the main chamber during the complete cycle of the piston.

11 Claims, 16 Drawing Figures

SURFACES FOR COMBUSTION CHAMBER OF INTERNAL COMBUSTION ENGINE HAVING CONTROLLED FUEL INJECTION

This is a continuation of application Ser. No. 815,023, filed July 12, 1977, abandoned.

The present invention relates to a two or four stroke engine with controlled ignition, comprising at least a cylinder closed by a cylinder head, a piston reciprocating in the cylinder between a top dead centre and a bottom dead centre, a chamber and a prechamber forming a high turbulence combustion chamber, a fuel injector and a controlled ignition device and means for controlling the injection of the fuel so that it is carried out with an advance increasing greatly with the load of the engine.

We know that stratification, whose role is to ensure the combustion of a heterogeneous mixture, has a main advantage in allowing the use of weak mixtures and consequently in reducing the amounts of unburnt gases and nitrogen oxide.

To obtain this stratification, at present a sufficiently rich mixture is provided adjacent the ignition device so as to cause the ignition of the fuel, the combustion then being propagated by itself with a weak mixture.

The techniques used consist in injecting the fuel either directly into the combustion chamber or into the prechamber. The first technique provides stratification owing to the aerodynamic effects generated by the movement of the piston which causes an orientated turbulence of the air at the beginning of ignition. It does not however give entire satisfaction, on the one hand, because it is difficult to tune and, on the other, because its results depend greatly on the speed of rotation of the engine.

The second technique provides static stratification by ensuring a difference of richness of mixtures in the prechambered in the main chamber. It is more reproducible than the preceding one but, on the other hand, it requires that the two chambers be separated by a throttle portion which gives less powerful performances, as well as the presence of a second injection or carburation to enrich the mixture in the prechamber.

The present invention proposes to remedy the disadvantages of known techniques while conserving their advantages and, for this, it has as its object a two or four stroke engine with controlled ignition characterised in that the prechamber is formed in the cylinder head and communicates without throttle portion with the chamber in that the fuel injector and the controlled ignition device open into the prechamber and in that the lower face of the cylinder head and the upper face of the piston form an impelling surface, the inlets of the chamber and the prechamber communicating with the impelling surface which surrounds the prechamber.

With these arrangement, on low load, so with a low injection advance, the movement of the air during the period of compression induced by the movement of the piston causes a back flow to the chamber and prechamber, which favours the maintenance of the fuel in the prechamber and provides consequently a sufficient richness of mixture for ignition of this mixture. On the other hand, on high load, since the injection takes place well before the ignition, i.e. at the beginning of the compression phase, an extremely homogeneous mixture is obtained of a richness close to 1, which means that the ratio of the masses of air and fuel is close to 15. Thus, the air admitted is fully used. Finally, whether on low or high load, minimum pollution is obtained by means of a simple technological solution.

With a two stroke engine, the chamber is formed in the cylinder head and is formed from adjacent elementary chambers between which extends the impelling surface.

With, on the other hand, a four stroke engine, in which the cylinder head comprises inlet and outlet pipes connected to the chamber through inlet and outlet valves, the chamber comprises a complementary part in the piston, this part being formed from adjacent elementary chambers into which the impelling surface extends.

A two or four stroke engine having the above characteristics provides a high stratification of the combustible mixture so that it can operate close to full admission whatever the load and, in particular with a large excess of air on low loads. In this case in fact the combustion is confined to the prechamber since the aerodynamic effects generated by the movement of the piston prevent the fuel belatedly introduced from penetrating into the elementary chamber.

Under the very severe conditions imposed by low loads, the operation of the engine of the invention can be considerably improved by avoiding, at the end of compression, any by-pass of air between the impeller surface and the prechamber.

The present invention proposes then to attain also this object and, to do this, the engine concerned is characterised moreover in that the part of the impelling surface located between the side walls of two adjacent elementary chambers narrows from the periphery of the cylinder bore to the periphery of the prechamber where its width is cancelled out.

Since the impelling surface disappears at the periphery of the prechamber, the air between it and the piston at the end of compression is now impelled solely towards the elementary chambers. These latter are thus the seat of a greater orientated turbulence, confining better at low loads the combustion in the prechamber.

Advantageously, the depth of the prechamber is greater than that of the elementary chambers.

With this arrangement, the local compression volumetric ratio inside the prechamber is lower than that inside the elementary chambers. It follows that at the end of compression the air passes not only from the impelling surface towards the elementary chambers but flows moreoever naturally from these latter towards the prechamber increasing even more the aerodynamic closing off effect.

According to a preferred embodiment, the elementary chambers have a decreasing depth from their communication with the prechamber to their end opposite said communication.

The natural flow of air towards the prechamber is then again favoured since the compression volumetric ratio in the elementary chambers is decreasing from their end opposite their communication with the prechamber up to this communication.

Advantageously, the elementary chambers have a cross section decreasing from their communication with the prechamber to their end opposite this communication and open into the prechamber without restriction of section. This condition is satisfied in particular when the side walls of each elementary chamber are parallel to each other.

Thus, the speed of the air inside the elementary chambers is practically constant. Moreover, as the cross section of the elementary chambers is greatest at the periphery of the prechamber, the combustion can be as rapid as possible for the greatest part of the fuel mixture to be burned, which allows a high cycle efficiency to be maintained.

It will be noted that because the elementary chambers open into the prechamber without restriction of section, the flame can be propagated freely therein when the load increases. Full load combustion can then be extended even when the piston has already gone down again, which allows the fuel stored in the impelling zones to be burned.

Preferably, the elementary chambers extend as far as the periphery of the cylinder bore.

Ventilation of the impelling surface, which depends on the wet perimeter of the elementary chambers, can thus be greatly intensified. Furthermore, full load combustion can be extended even longer.

According to another characteristic of the invention, the elementary chambers are spread out around the prechamber so that, even if they do not as a whole present at least a plane of symmetry, their mean axis passes through the mean axis of the prechamber.

This arrangement has the advantage of avoding the creation of a kinetic moment in the prechamber.

According to another characteristic of the invention, the volume of the prechamber represents about 20 to 30% of the total volume of the combustion chamber, which allows the fuel mixture confined in the prechamber to have a better homogenization at low loads.

Several embodiments of the invention are shown solely as non-limiting examples in the accompanying drawings in which.

Figure 1:
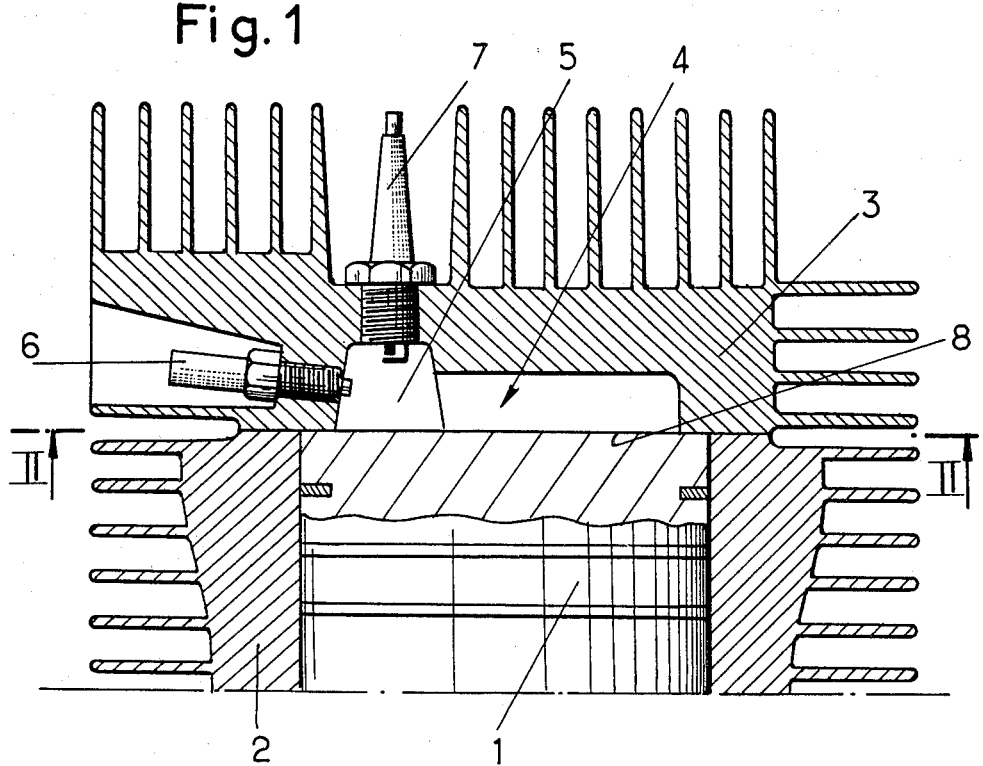
FIG. 1 shows in partial diagrammatic section a two stroke engine according to the invention.
Figure 2:
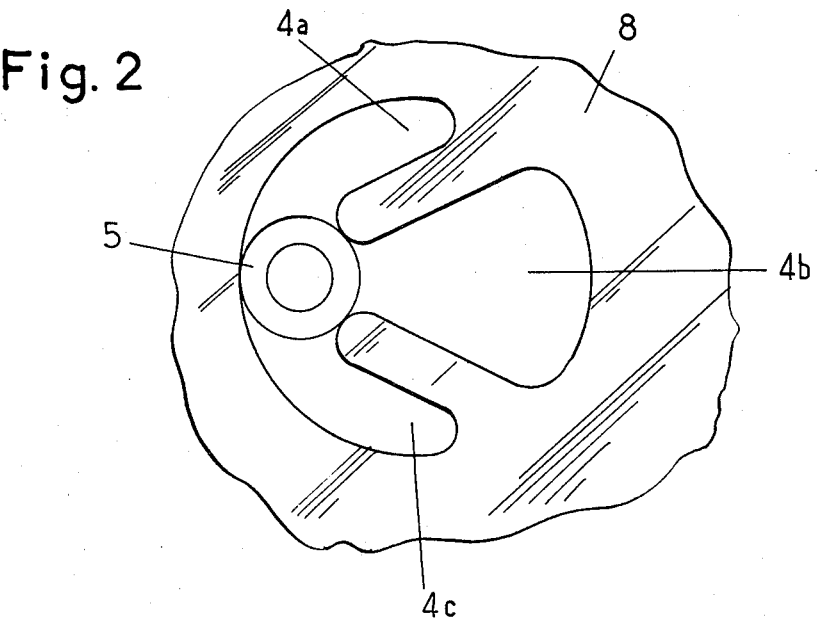
FIG. 2 is a view taken along line II—II of FIG. 1.

In FIG. 1, there can be seen partially shown a two stroke engine comprising a flat piston 1 which moves in cylinder 2 closed by a cylinder head 3. The cylinder head 3 is shaped to form a chamber 4 whose volume could represent 70 to 80% of the total volume of the combustion chamber when the piston is at top dead centre. In the example considered here, this chamber is of the ventilated turbulence type and is formed from three elementary chambers 4a, 4b and 4c seen in FIG. 2.

The cylinder head receives also a prechamber 5 into which opens fuel injector 6 below the end of plug 7. As FIG. 1 shows, on the one hand, and FIG. 2, on the other, prechamber 5 communicates without throttle portion with chamber 4.

The lower face of the cylinder head and the upper face of the piston form an impelling surface 8 into which opens the prechamber and the elementary chambers, the impelling surface surrounding the prechamber.

Figure 5:
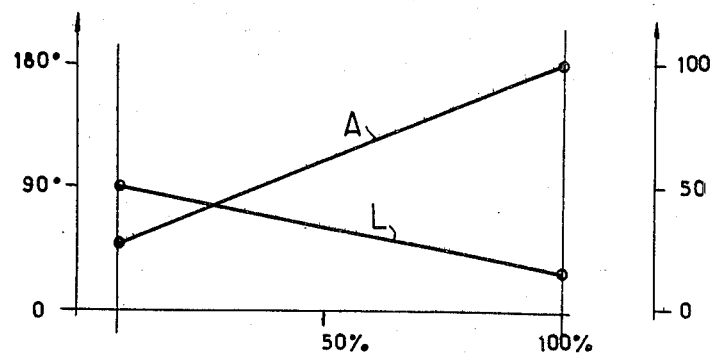
FIG. 5 is a diagram showing an example of the injection and advance laws.

Means not shown of conventional type are moreover provided so that the injection of fuel into the prechamber is controlled with an advance which increases greatly with the load of the engine, this advance being very small on low load and very great on high load. For example, as shown in FIG. 5, when the amount injected, plotted in abscissa, varies from 20 to 100%, the advance may vary from 40° to 180°. This advance is shown by the straight line A in relation to the scale shown at the left of the drawing.

It will be understood that thus at low lead, a small amount of fuel is injected at the end of the compression stroke of the piston and that the fresh air admitted is compressed and progressively pushed towards chamber 4 and prechamber 5, which creates a counter current unfavourable to the penetration of the fuel jet into chamber 4. The result is that despite the small quantity of the fuel injected there is maximum enrichment in the prechamber, which ensures that ignition takes place without the great excess of air in chamber 4 being able to oppose it.

On the contrary, when on high load a large amount of fuel is injected, it will be understood that the mixture obtained becomes very homogeneous due to the long time available and to the high turbulence at the end of compression.

Figure 3:
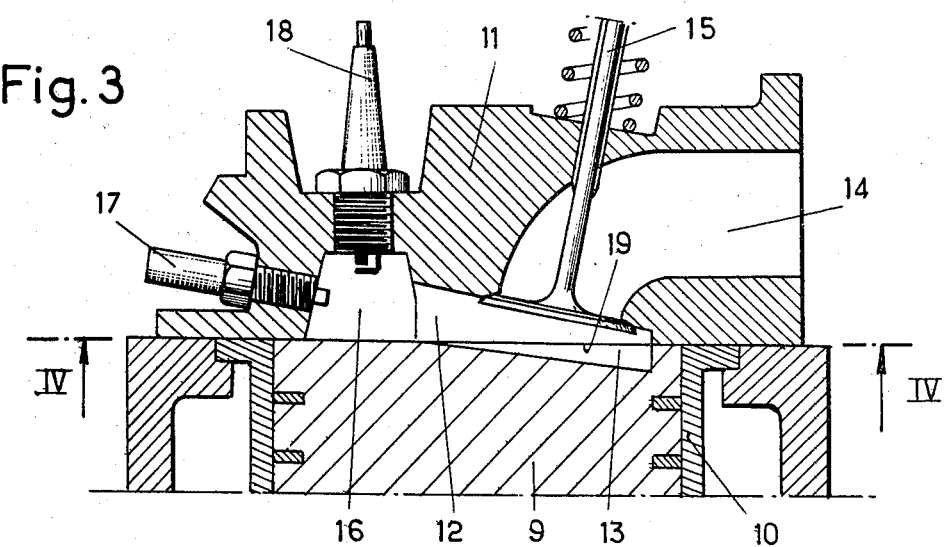
FIG. 3 shows in partial diagrammatic section a four stroke engine according to the invention.
Figure 4:
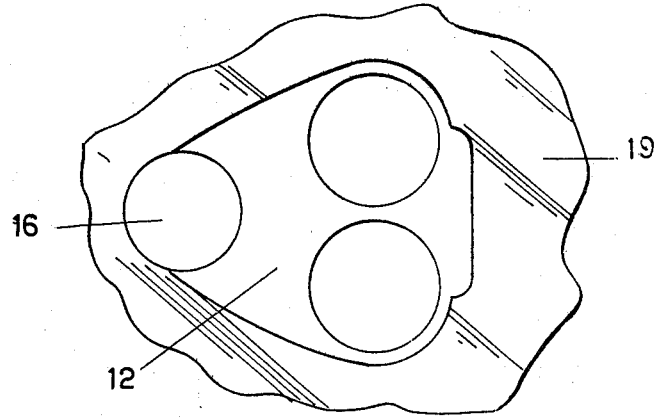
FIG. 4 is a view taken along line IV—IV of FIG. 3.

Tests have shown that the application of the invention is particularly advantageous for valveless two stroke engines, but the invention is also applied with advantage of two and four stroke engines having valves although the presence of the valves does not always permit such a great freedom of choice in the design of the structure of the chamber or even of the prechamber. This is why there is shown in FIG. 3, in a partial view, a four stroke engine conforming to the invention comprising in a conventional way a piston 9 which moves in a cylinder 10 closed by a cylinder head 11.

The chamber is formed from a compartment 12 in cylinder head 11 and from a compartment 13 in piston 9. It should be noted that these compartments may have extremely variable relative dimensions, one of them may have moreover a zero volume.

Compartment 12 receives the inlet and outlet pipes only one of which is shown at 14 and the valves only one of which is shown at 15. It communicates without throttle portion with a prechamber 16 in which emerge the fuel supply 17 and plug 18.

As for compartment 13, it is formed from elementary chambers only one of which can be seen in FIG. 3 but which could have the same lay-out as those shown in FIG. 13 and which will be discussed hereafter.

The lower face of cylinder head 11 and the upper face of piston 9 form again an impelling surface 19 surrounding prechamber 16.

We refer now to FIG. 5 to recall that it represents a diagram in which we find, plotted in abscissa, the amount of fuel injected as a percentage and, and as ordinate on the left, the injection advance in degrees. This diagram shows also plotted as ordinates on the right, graduated from 0 to 100, a possible limitation of the air input flow, e.g. by means of a shutter placed in the air inlet manifold to provide a limitation shown by curve L. It can be seen that in such a case, there is a linear variation from a value of about 50 to a value of about 15 when the amount injected goes from 20 to 100%. This limitation of the ratio of air/fuel mass at values lower than the feasible minimum improves the operation of the engine.

The results obtained during tests carried out on different engines using the present invention were extremely favourable in all cases, more particularly in the case of two stroke engines, as mentioned above.

By way of example we give below the results obtained on a two stroke engine whose minimum air/fuel ratio obtainable at idling speed is 120 and whose adjustment is conformable to the table below:

|  | Injection advance | Amount injected | Fuel ratio |
|---|---|---|---|
| Off load idling and operation | 40° | 20% | 50 |
| Full load | 180° | 100% | 15 |

The performances obtained in the tests were the following, respectively for an unmodified engine and for an engine modified in accordance with the invention.

|  | Unmodified engine | Modified engine |
|---|---|---|
| Power | 11.5 h.p./cylinder | 20 h.p./cylinder |
| Consumption |  |  |
| - 100% load | 350 g/h.p./h | 210 g/h.p./h |
| - 50% load | 380 g/h.p./h | 200 g/h.p./h |
| Polluting masses |  |  |
| - unburnt hydrocarbides | base 100 | 6 |
| carbon oxide | base 100 | 10 |
| nitrogen oxide | base 100 | 100 |

This table shows that the power of the engine is greatly increased whereas the consumption is much smaller.

If the nitrogen oxide polluting masses remain unchanged, which is not surprising, on the other hand the amount of unburnt hydrocarbides has diminished by 94% and the amount of carbon oxide has diminished by 90%.

Figure 6:
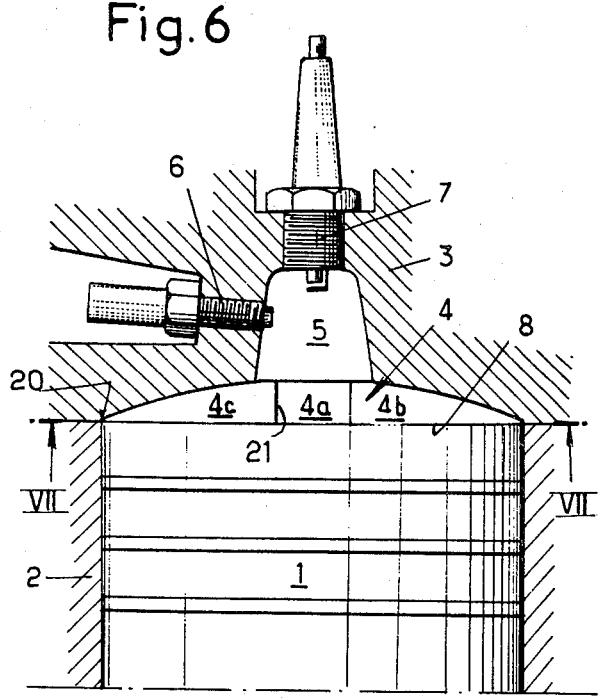
FIG. 6 shows in partial diagrammatic section a variation of the engine shown in FIG. 1.
Figure 8:
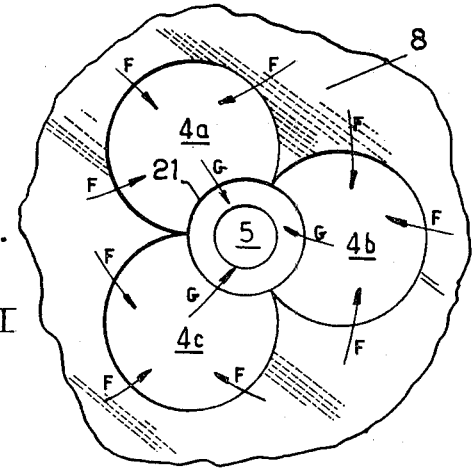
FIGS. 8 to 13 are similar views to FIG. 7 showing different embodiments.

In FIG. 6 which shows a variation of the two stroke engine of FIG. 1, the reference used are the same as those of FIG. 1 when they refer to the same parts of the engine. It will however be noticed here that chamber 4 is formed from four elementary chambers 4a, 4b, 4c, 4d staggered by 90% in relation to each other.

The principal problem to resolve in the very severe operating conditions of low loads is to avoid the formation at the end of combustion of a by-pass of air between the impelling surface 8 and prechamber 5, so as to provide combustion closely confined therein. For this purpose, the part of the impelling surface located between the side walls of two adjacent elementary chambers (e.g. 4a and 4b) narrows from the periphery 20 of the cylinder bore to the periphery 21 of the prechamber where it is cancelled out. According to this solution, the elementary chambers tend then to occupy all the periphery of the prechamber, as shown in FIGS. 7 to 13.

Since the impelling surface 8 draws to a point at periphery 21, the air present at the end of compression between the lower face of the cylinder head and the upper face of piston 1 can no longer flow directly into prechamber 5 and its transfer is effected solely towards the elementary chambers a shown by arrows F. The aerodynamic closing off effect generated at the end of compression is thus improved, which permits the desired confinement of combustion to be obtained.

Referring in particular to FIG. 6, it will be noticed that the prechamber is much deeper than the elementary chamber. Thus, the local compression volumetric ratio inside the prechamber is smaller than that inside the elementary chambers. Now, taking this condition into account, the air transferred therein at the end of compression flows moreover naturally towards the prechamber following arrows G, which consequently increases yet again the aerodynamic closing off effect.

Figure 14:
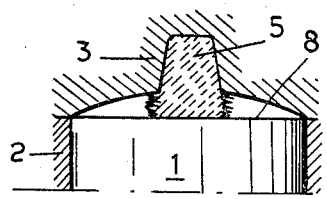
FIGS. 14 to 16 are very diagrammatic partial sectional views of the engine shown in FIG. 6 and showing the propagation of the flame in the elementary chambers thereof, during its operation at full load.
Figure 15:
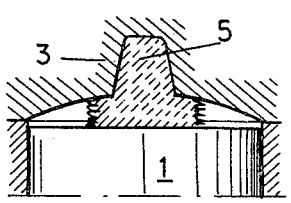
Figure 16:
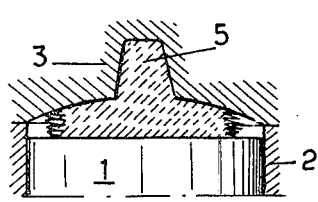

In FIG. 6 it will also be noticed that the elementary chambers have a depth decreasing from their communication with the prechamber to their end opposite this communication and open without restriction of section into said prechamber. The natural flow of air towards the prechamber is thus again favoured. However, the flame can freely spread into the elementary chambers when the load of the engine increases so that the duration of combustion at full load can be extended even though the piston has already gone down again, as shown in FIGS. 14 to 16.

Figure 7:
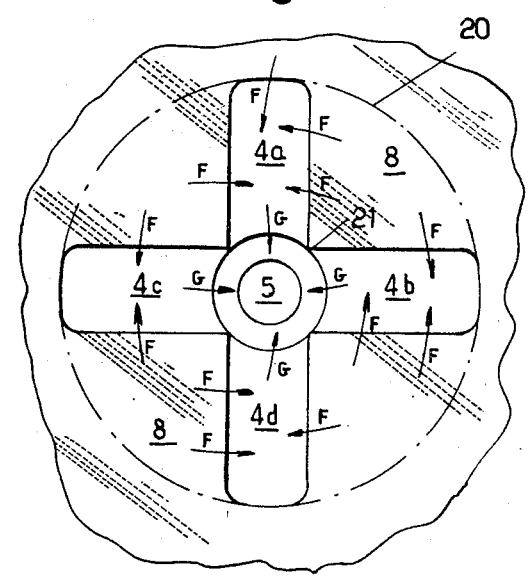
FIG. 7 is a view taken along line VII—VII of FIG. 6.
Figure 9:
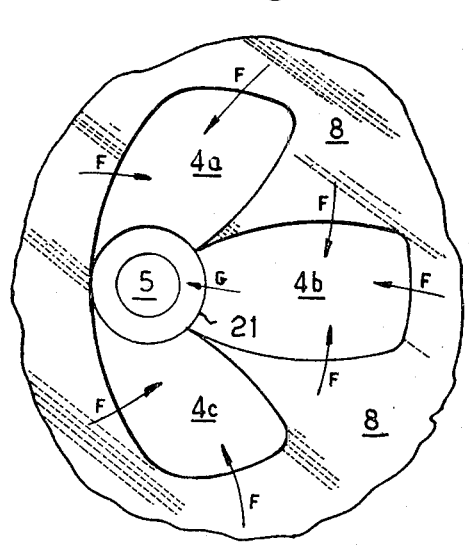
Figure 10:
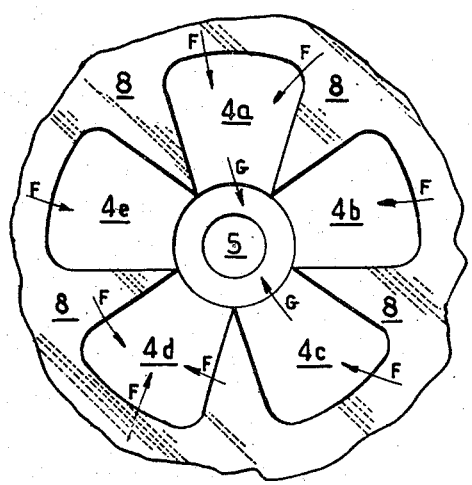
Figure 11:
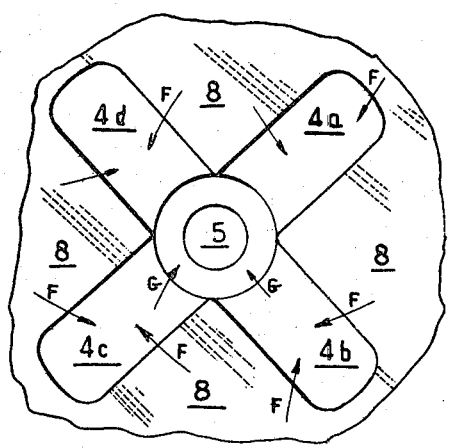
Figure 12:
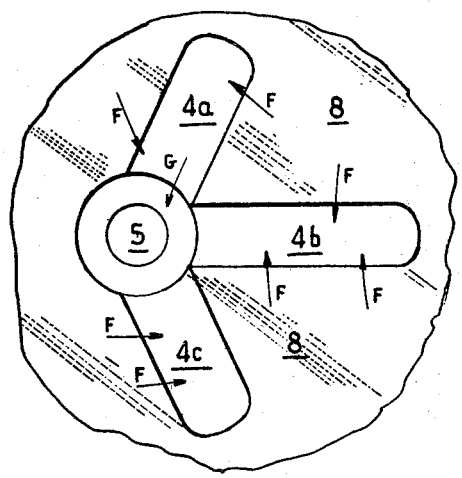

In accordance with the invention, and as seen in FIGS. 6 and 7, the elementary chambers are moreover formed so that their cross section decreases from their communication with the prechamber to their end opposite to this communication. This condition is of course satisfied when the two side walls of each elementary chamber are parallel as shown in FIGS. 7 and 11 to 13.

Thus, it is possible to avoid any substantial variation of the speed of the air flowing from the elementary chambers to the prechamber. Moerover, since the cross section of the elementary chambers is greatest at the periphery of the prechamber, the combustion can be as rapid as possible for the greatest part of the fuel mixture to be burnt.

Since the maximum ventilation of the impelling surface is tied up with the wet perimeter of the elementary chambers, these must then be as long as possible. This is why, in accordance with the invention, they extend preferably as far as periphery 20 of the cylinder bore.

Figure 13:
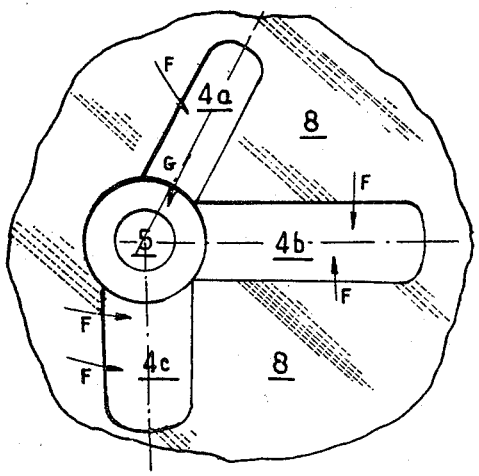

Referring in particular to FIG. 13, it will be noticed moreover that the elementary chambers are spread out around the prechamber so that they do not present a general plane of symmetry. Their mean axis, however, passes through the mean axis of the prechamber, so as to avoid the formation of a kinetic moment inside the latter.

For completeness, we give below the characteristics presented by the two stroke engine shown in FIG. 6.

If we designate by A the diameter of the cylinder bore, the prechamber has a depth of 0.4 A and a diameter of 0.3 A at its inlet into the impelling surface. The four elementary chambers have, as far as they are concerned, a depth of 0.1 A at the periphery of the prechamber and a length of 0.35 A.

If moreover we designate by S the surface of the piston, the impelling surface has a total area of 0.4 S whereas the prechamber and the elementary chambers have at their inlet into the impelling surface an area of 0.1 S and 0.5 S respectively.

Finally if we designate by V the total volume of the combustion chamber, the prechamber has a volume of 0.3 V.

What is claimed is:

1. In an internal combustion engine with controlled ignition, including at least a cylinder closed by a cylinder head, a piston reciprocating in the cylinder in a cycle between a top dead centre and a bottom dead centre, a main chamber and a prechamber forming a high turbulence combustion chamber, a fuel injector and a controlled ignition device, and means for controlling injection of the fuel so as to greatly increase the advance with the load on the engine, wherein the prechamber is formed in the cylinder head and the fuel injector and the controlled ignition device emerge into the prechamber, the improvement wherein the main chamber includes adjacent elementary chambers formed at least in the cylinder head, the lower face of the cylinder head extending between said elementary chambers and the upper face of the piston forming an impelling surface surrounding the prechamber, the inlets of the chamber and prechamber opening into the impelling surface without throttle between the prechamber, the elementary chambers, and the main chamber during the complete cycle of the piston, whereby due to the absence of throttle between the prechamber and the main chamber and between the prechamber and the elementary chambers, and the cooperation of the fuel controlled injection means, the combustion on low load is confined within the prechamber by a free circulation of air from the elementary chambers into the prechamber under the action of the piston arriving at top dead centre, and the combustion on high load spreads out freely from the prechamber into the elementary chambers as the piston goes down from top dead centre.

2. The improvement according to claim 1, in which the cylinder head includes inlet and outlet pipes connected to the main chamber by means of inlet and outlet valves, and wherein the main chamber includes adjacent elementary chambers formed in both the cylinder head and the face of the piston, the upper face of the piston extending between the adjacent elementary chambers forming portions of said impelling surface and the elementary chambers formed in the cylinder head and the face of the piston being complementary.

3. The improvement according to claim 2, wherein the portion of the impelling surface located between the side walls of two adjacent elementary chambers narrows from the periphery of the cylinder bore to the termination of the portion at the periphery of the prechamber.

4. The improvement according to claim 1, wherein the elementary chambers have a cross section decreasing from their communication with the prechamber to their end opposite this communication, and open into the prechamber without restriction.

5. The improvement according to claim 4, wherein the side walls of each elementary chamber are parallel to each other.

6. The improvement according to claim 1 wherein the portion of the impelling surface located between the side walls of two adjacent elementary chambers narrows from the periphery of the cylinder bore to the termination of the portion at the periphery of the prechamber.

7. The improvement according to claim 6, wherein the depth of the prechamber is greater than that of the elementary chambers.

8. The improvement according to claim 6, wherein the elementary chambers have a depth decreasing from their communication with the prechamber to their end opposite to said communication.

9. The improvement according to claim 6 wherein the elementary chambers extend as far as the periphery of the cylinder bore.

10. The improvement according to claim 6, wherein the elementary chambers are spaced out around the prechamber so that, if they do not present as a whole a plan of symmetry, their mean axis passes through the mean axis of the prechamber.

11. The improvement according to claim 6, wherein the volume of the prechamber represents about 20 to 30% of the total volume of the combustion chamber.

* * * * *